United States Patent [19]

Shibata et al.

[11] 3,894,187

[45] July 8, 1975

[54] CIRCUIT FOR COMPARING AT LEAST TWO INPUT SIGNALS TO GENERATE CONTROL SIGNALS

[75] Inventors: Shinichi Shibata; Takashi Saeki, both of Tokyo, Japan

[73] Assignee: Tokyo Shibaura Electric Co., Ltd., Kanagawa-ken, Japan

[22] Filed: Oct. 31, 1973

[21] Appl. No.: 411,200

[52] U.S. Cl. ............... 179/1 HF; 307/232; 340/346

[51] Int. Cl. ....................... H04m 1/60; H01h 47/02

[58] Field of Search ............ 179/1 HF, 1 VC, 81 B; 307/231, 232; 317/136, 138; 340/346

[56] References Cited

UNITED STATES PATENTS

| | | | |
|---|---|---|---|
| 3,179,747 | 4/1965 | Grace et al. | 340/346 |
| 3,441,809 | 4/1969 | Newland | 307/232 |
| 3,469,151 | 9/1969 | Newland | 307/232 |
| 3,751,602 | 8/1973 | Breeden | 179/1 HF |

*Primary Examiner*—Thomas A. Robinson
*Attorney, Agent, or Firm*—Oblon, Fisher, Spivak, McClelland & Maier

[57] ABSTRACT

A circuit which compares at least two input signals to generate control signals is adapted for use in controlling the amount of attenuation of communication channels in a loud-speaking telephone system.

10 Claims, 7 Drawing Figures

CIRCUIT FOR COMPARING AT LEAST TWO INPUT SIGNALS TO GENERATE CONTROL SIGNALS

BACKGROUND OF THE INVENTION

1. Field of the Invention

This invention generally relates to a circuit for comparing at least two input signals to generate control signals and, more particularly, to a circuit adapted for use in controlling the amount of attenuation of communication channels in a loud-speaking telephone system.

2. Description of the Prior Art

The conventional loud-speaking telephone system included a circuit for detecting communication signals and switching from a receiving condition to a transmitting condition and vice versa.

While somewhat satisfactory, such a circuit, however, was complicated in construction and could not be fabricated in an integrated circuit.

Furthermore, in the above telephone system, the switching action was preferably accomplished without interfering with naturality of communication; however, this was not completely satisfactory in the conventional telephone system, mainly because the detecting time associated with the communication was not independent of the switching time.

SUMMARY OF THE INVENTION

Accordingly, it is one object of this invention to provide a new and improved unique circuit for comparing at least two input signals to generate control signals.

It is another object of this invention to provide a new and improved unique integrated circuit for comparing at least two input signals to generate control signals.

It is yet another object of this invention to provide a new and improved unique circuit adapted for use in detecting communication signals within a loud-speaking telephone system in order to switch communication channels.

It is a further object of this invention to provide a new and improved unique loud-speaking telephone system in which the time required for detecting communication signals is independent of that for switching from a receiving condition to a transmitting condition and vice versa.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION THE PREFERRED EMBODIMENTS

Figure 1:
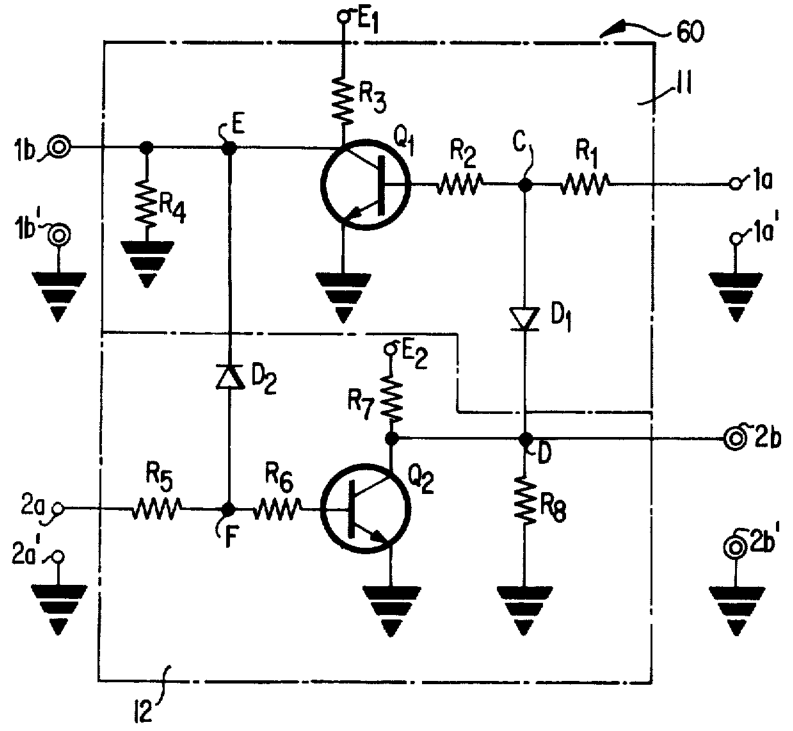
FIG. 1 illustrates a circuit diagram of a preferred embodiment according to the present invention.

Referring now to the drawings, wherein like reference numerals designate identical or corresponding parts throughout the several views and more particularly to FIG. 1, a circuit for comparing two input signals to generate control signals is shown which includes a first transistor circuit 11 and a second transistor circuit 12.

The first transistor circuit 11 has input terminals *1a* and *1a'* and output terminals *1b* and *1b'*. The input terminal *1a* is connected to the base of a transistor $Q_1$ through series connected resistors $R_1$ and $R_2$, and the terminal *1a'* is connected to a reference potential such as ground. The terminal *1b* is connected to the collector of the transistor $Q_1$ and is also connected to the ground through a resistor $R_4$, and the terminal *1b'* is also connected to the ground.

The collector of the transistor $Q_1$ is connected to a voltage supply $E_1$ through a resistor $R_3$. A diode $D_1$ is connected between a junction D and a junction C between the resistors $R_1$ and $R_2$.

The second circuit 12 has input terminals *2a* and *2a'* and output terminals *2b* and *2b'*. The input terminal *2a* is connected to the base of a transistor $Q_2$ through series connected resistors $R_5$ and $R_6$, and the terminal *2a'* is connected to the ground. The terminal *2b* is connected to the collector of the transistor $Q_2$ and is also connected to the ground through a resistor $R_8$, and the terminal *2b'* is connected to ground. The collector of the transistor $Q_2$ is connected to a voltage supply $E_2$ through a resistor $R_7$.

A diode $D_2$ is connected between a junction E and a junction F between the resistors $R_5$ and $R_6$.

The circuit shown in FIG. 1 operates as follows.

Mode 1

When no input signal is supplied to either of the input terminals 1a and 2a, neither of the transistors $Q_1$ and $Q_2$ is conductive. Thus, a control signal voltage at the output terminal *1b* is $$\frac{R_4}{R_3 + R_4} E_1 \text{ volts,}$$

and a control signal voltage at the output terminal *2b* is $$\frac{R_8}{R_7 + R_8} E_2 \text{ volts.}$$

Mode 2

When an input signal $A_1$ is applied to the input terminal *1a* prior to another input signal $A_2$ being applied to the input terminal *2a*, the transistor $Q_1$ is turned on so that the collector thereof and the terminal *1b* become nearly at ground potential. Consequently, when an input signal $A_2$ is applied to the input terminal *2a*, the current thereof flows through the collector of transistor $Q_1$, through the resistor $R_5$ and the diode $D_2$ so that the transistor $Q_2$ cannot be turned on.

As input signal $A_1$ and the resistor $R_2$ are respectively larger than $$\frac{R_8}{R_7 + R_8} E_2 \text{ volts}$$

and each of the resistors $R_1$ and $R_3$, namely;

$$A_1 > \frac{R_8}{R_7 + R_8} E_2 \text{(volts)},\ R_2 >> R_1 \text{ and } R_2 >> R_3,$$

the control signal voltage at the output terminal 2$b$ is $$\frac{R_8}{R_7 + R_8} E_2 + A_1' \quad \text{volts},$$

wherein $A'_1$ is represented by the following equation:

$$A_1' = \frac{R_7 R_8}{R_7 R_8 + R_8 R_1 + R_1 R_7} A_1 - \frac{R_8}{R_7 + R_8} E_2 \text{ (volts)}$$

Mode 3

When an input signal $A_2$ is applied to the input terminal 2$a$ prior to another input signal $A_1$ being applied to the input terminal 1$a$, the transistor $Q_2$ is turned on but the transistor $Q_1$ is not turned on. Therefore, the voltage at the output terminals 2$b$ and 1$b$ are ground potential and $$\frac{R_4}{R_3 + R_4} E_1 + A_2' \quad \text{volts.},$$

respectively, wherein $A'_2$ is represented by following equation:

$$A_2' = \frac{R_3 R_4}{R_3 R_4 + R_3 R_5 + R_4 R_5} A_2 - \frac{R_4}{R_3 + R_4} E_1 \text{ (volts)}$$

In this case, the circuit is also designed to satisfy following conditions;

$$A_2 > \frac{R_4}{R_3 + R_4} E_1 \text{ (volts)},\ R_6 >> R_5 \text{ and } R_6 >> R_7.$$

The above-mentioned operational modes are shown in Table 1.

able
1

| Operational Modes | Voltages at the Output Terminal 1b | Voltages at the Output Terminal 2b |
|---|---|---|
| Mode 1 | $\frac{R_4}{R_3 + R_4} E_1$ | $\frac{R_8}{R_7 + R_8} E_2$ |
| Mode 2 | $\cong 0$ | $\frac{R_8}{R_7 + R_8} E_2 + A_2'$ |
| Mode 3 | $\frac{R_4}{R_3 + R_4} E_1 + A_2'$ | $\cong 0$ |

Figure 2:
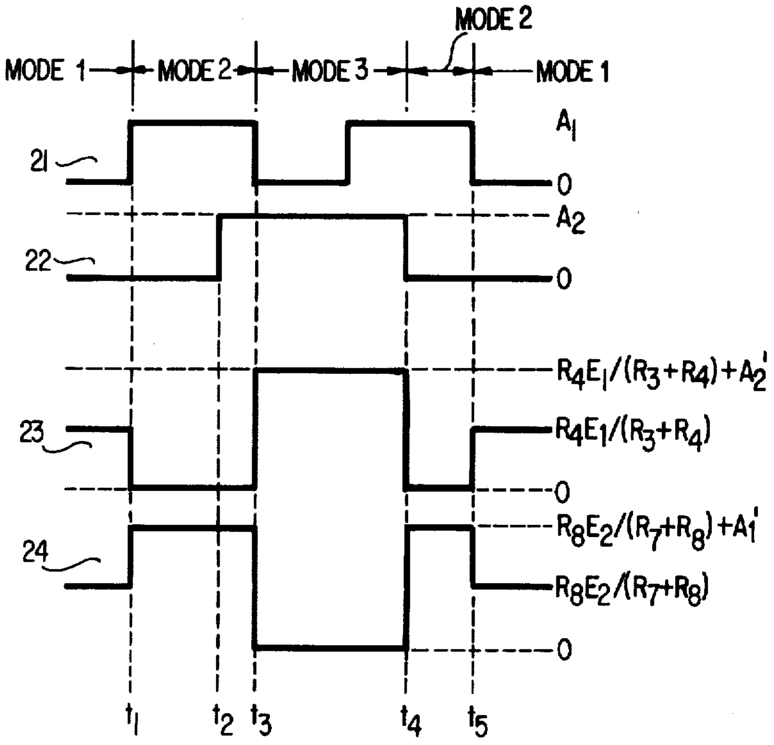
FIG. 2 is a voltage diagram of signals in the system shown in FIG. 1.

FIG. 2 illustrates a waveform diagram of the input and output signals of the circuit shown in FIG. 1. In this diagram, waveforms 21 and 22 are respectively input signals applied at the terminals 1$a$ and 2$a$ and waveforms 23 and 24 are respectively output or control signals at the output terminals 1$b$ and 2$b$.

As the input signal 21 is applied to the input terminal 1$a$ at a time $t_1$ when the input signal 22 is not yet applied to the input terminal 2$a$, the circuit operates under Mode 2 for a duration of time from $t_1$ to $t_3$ and the control signals 23 and 24 at the output terminals 1$b$ and 2$b$ are respectively at 0 and $$\frac{R_8}{R_7 + R_8} E_2 + A_1' \quad \text{volts.}$$

When the input signal 21 changes in magnitude from $A_1$ to 0 volts at $t_3$, the input signal 22 has already changed in magnitude from 0 to $A_2$ volts at $t_2$ and thus for the duration of time from $t_3$ to $t_4$ the circuit operates under Mode 3 wherein the control signals 23 and 24 are respectively $$\frac{R_4}{R_3 + R_4} E_1 + A_2'$$

and 0 volts.

Similarly, the circuit operates under Mode 2 for the duration of time from $t_4$ to $t_5$, and under Mode 1 for the duration of time before $t_1$ and after $t_5$.

Figure 3:
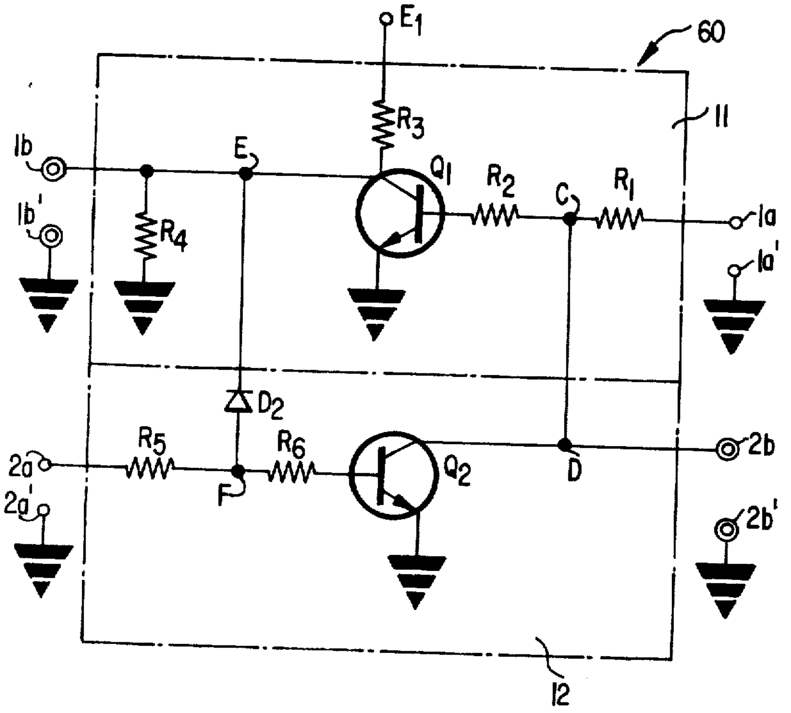
FIGS. 3 – 6 show circuit diagrams of other embodiments according to the present invention.

FIG. 3 shows a second embodiment of the present invention wherein the collector of the transistor $Q_2$ is directly connected to the junction C and the resistors $R_7$ and $R_8$ shown in FIG. 1 are removed. In this circuit, two kinds of control signals appear at the output terminal 2$b$, but the control signal at terminal 1$b$ is the same as that of the circuit shown in FIG. 1.

When the circuit operates under Mode 1, the control signal at the output terminal 2$b$ becomes 0 volts.

During the operation under Mode 2, the control signal at output terminal 2$b$ is substantially equal to the input signal $A_1$ applied to the input terminal 1$a$ because $R_2 > R_1$.

Further, when the circuit operates under Mode 3, the transistor $Q_2$ is conductive and the control signal at terminal 2$b$ is nearly equal to 0 volts.

The operational modes of this circuit are arranged in Table 2.

Table 2

| Operational Modes | Voltages at the Output Terminal 1b | Voltages at the Output Terminal 2b |
|---|---|---|
| Mode 1 | $\frac{R_4}{R_3 + R_4} E_1$ | 0 |
| Mode 2 | $\cong 0$ | $\cong A_1$ |
| Mode 3 | $\frac{R_4}{R_3 + R_4} E_1 + A_2$ | $\cong 0$ |

Figure 4:
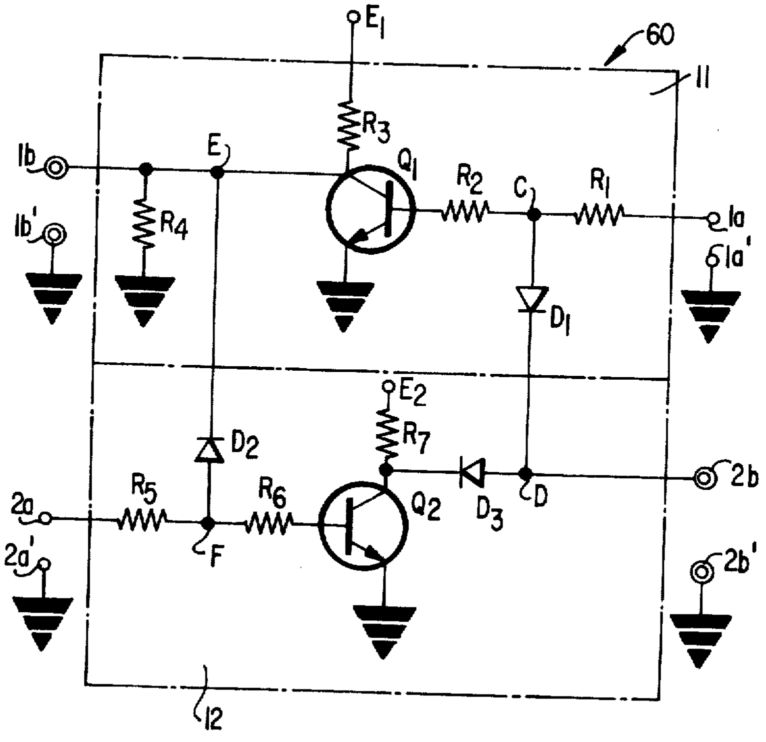

FIG. 4 shows a third embodiment of the present invention wherein the collector of transistor $Q_2$ is connected to the output terminal 2$b$ through a diode $D_3$ and the junction C is directly connected to the junction D through the diode $D_1$. This circuit operates in substantially the same way as the circuit shown in FIG. 3 and thus a detailed operation thereof is omitted.

Figure 5:
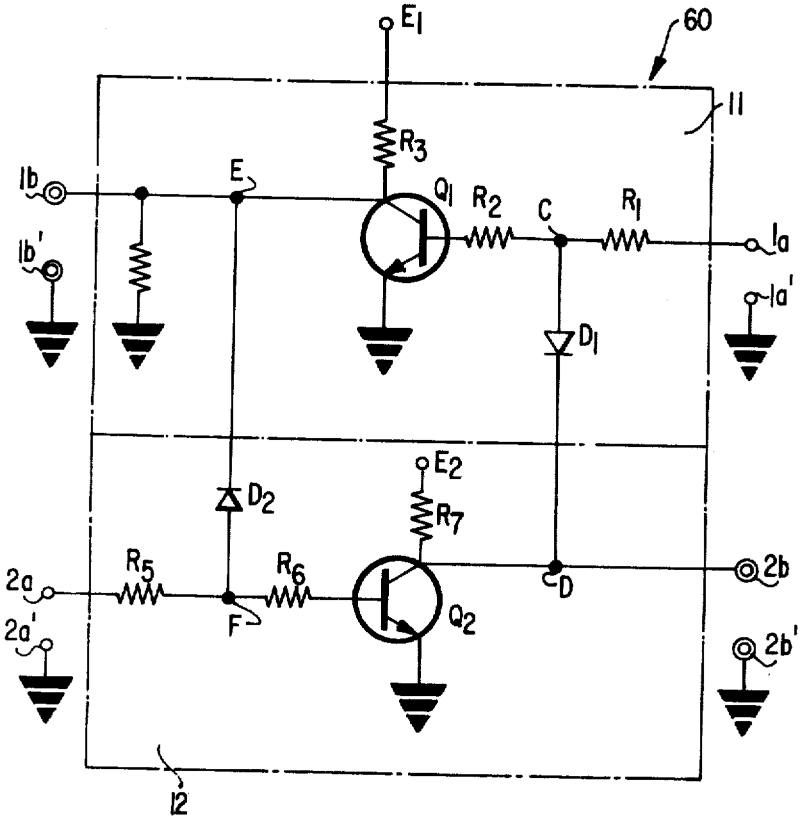

FIG. 5 shows a fourth embodiment of the present invention, wherein only the resistor $R_8$ shown in FIG. 1, is removed, but the operation thereof is considerably different from that of the circuit shown in FIG. 1. When the circuit operates under Modes 1 or 2, the transistor $Q_2$ is not turned on and the control signal at the output terminal 2*b* is $E_2$ volts. The operation under Mode 3 of this circuit is the same as that of the above-mentioned circuits. Therefore, the operational modes of this circuit may be represented as in Table 3.

Table 3

| Operational Modes | Voltages at the Output Terminal 1b | Voltages at the Output Terminal 2b |
|---|---|---|
| Mode 1 | $\frac{R_4}{R_3 + R_4} E_1$ | $E_2$ |
| Mode 2 | $\cong 0$ | $E_2$ |
| Mode 3 | $\frac{R_4}{R_3 + R_4} E_1 + A_2'$ | $\cong 0$ |

Figure 6:
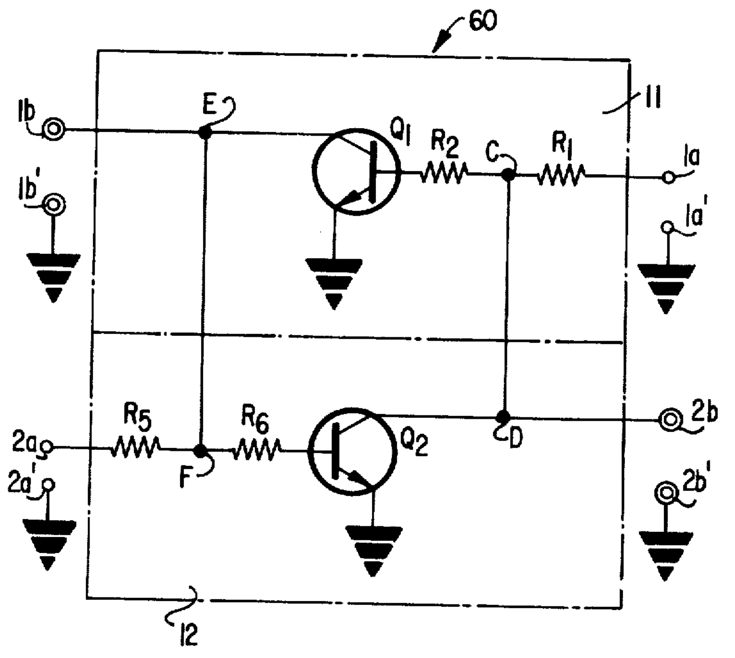

FIG. 6 shows a fifth embodiment of the present invention wherein transistor circuits 11 and 12 are arranged symmetrically and each transistor circuit is of a same construction as the transistor circuit 12 shown in FIG. 3.

It may be understood with the aid of Table 2 that the operation of this circuit is described as Table 4.

Table 4

| Operational Modes | Voltages at the Output Terminal 1b | Voltages at the Output Terminal 2b |
|---|---|---|
| Mode 1 | 0 | 0 |
| Mode 2 | $\cong 0$ | $\cong A_1$ |
| Mode 3 | $\cong A_2$ | $\cong 0$ |

Obviously, numerous modifications and variations of the present invention are possible in light of the above teachings. For example, a symmetrical transistor circuit can be constructed in accordance with the transistor circuit 12 shown in FIGS. 4 and 5.

As will be clear to those skilled in the art, the circuits in accordance with this invention are quite simple in construction and may be fabricated readily in the form of integrated circuits. In addition, they have a significant advantage for use in controlling the amount of attenuation of communication channels in a loud-speaking telephone system.

Figure 7:
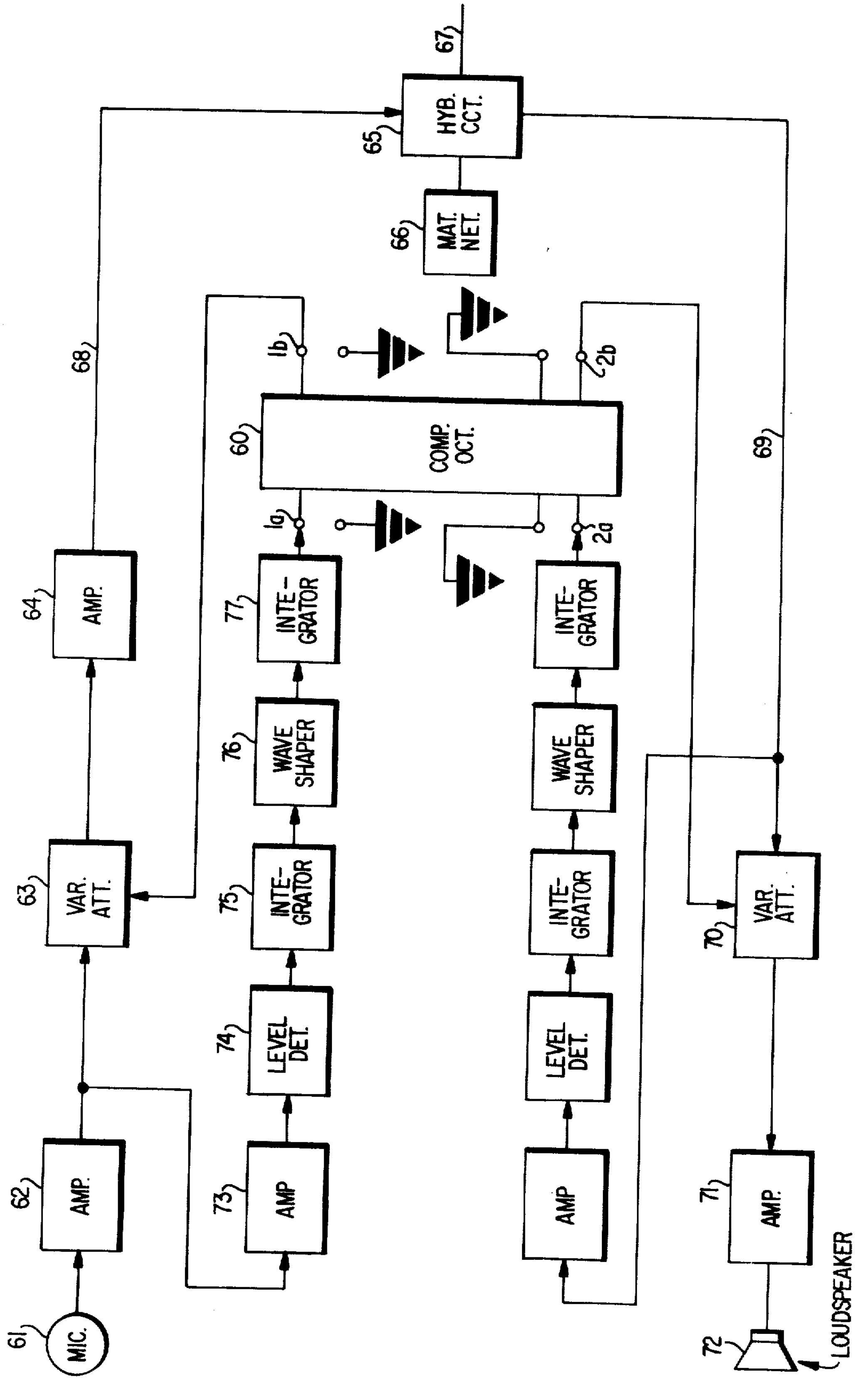
FIG. 7 is a block diagram of a loud-speaking telephone system which incorporates the circuit according to the present invention.

FIG. 7 shows a block diagram of a loud-speaking telephone system wherein a circuit 60 in accordance with this invention is applied thereto.

A voice signal produced at a microphone 61 is applied to a transmitting variable attenuator or a conventional voltage controlled attenuator 63 through an amplifier 62. The amount of attenuation in the variable attenuator 63 is controlled by the circuit 60, which is described in detail hereinafter. The voice signal from the attenuator 63 is transmitted to a telephone line 67 through an amplifier 64 and a hybrid circuit 65.

The transmitting voice signal is sent to a conventional telephone exchange (not shown) which connects the signal to a called subscriber.

The voice signal of a called subscriber, sent over the telephone line 67 through the telephone exchange, is received at the hybrid circuit 65. The received voice signal from the hybrid circuit 65 is applied to a receiving variable attenuator or a conventional voltage controlled attenuator 70. The impedance of the hybrid circuit 65 is terminated by a matching network 66 connected thereto, so that the voice signal of a transmitting channel 68 may not leak to a receiving channel 69. The amount of attenuation in the variable attenuator 70 is controlled by the circuit 60, which is also described hereinafter.

The voice signal from the attenuator 70 is applied to a loud-speaker 72 after being amplified by an amplifier 71. In this telephone system, when the transmitting voice signal appears before the receiving voice signal, the input signal is applied first to the input terminal 1*a* in the manner described below.

The transmitted voice signal is applied through an amplifier 73 to a level detector 74. The level detector 74 discriminates the voice signal from noise signals and it produces a pulse signal when the magnitude of the voice signal is at a predetermined level.

The pulse signal is then integrated by a first integrator 75. The time constant of the integrator 75 is preferably within 10 milliseconds because it is responsive to the building-up of the voice signal, which therefore determines the detecting time of transmitting voice signal. The integrated signal is converted to a dc signal of a predetermined magnitude by a waveform shaper 76.

The dc signal is rapidly integrated by a second integrator 77 to develop a signal to be applied the input terminal 1*a*.

The time constant of the integrator 77 may be of the order 150 milliseconds because it is responsive to the pitch of voice signal, which determines the switching time from a transmitting condition to a receiving condition and is longer than that of the integrator 75.

The circuit 60 operating under Mode 2 produces a control signal at the output terminal 2*b* which is applied to the receiving attenuator 70 to control the amount of attenuation thereof.

With the control signal, the amount of attenuation of the attenuator 70 is set to a maximum so that the receiving voice signal may be interrupted, while the amount of attenuation of the attenuator 63 is set to a minimum in accordance with the control signal from the terminal 1*b* to pass through the transmitting voice signal.

On the other hand, when the received voice signal is picked up before the transmitted voice signal and the circuit 60 operates under Mode 3, the control signal at the terminal 2*b* makes the attenuator 70 pass along the former but the control signal at the terminal 1*b* prevents the attenuator 63 from passing along the latter in substantially the same manner described above. Further, when no transmitting and receiving signals appear, the circuit 60 operates under Mode 1.

If the circuit 60 is constructed to operate in accordance with the modes of Table 1 or Table 3, the amounts of attenuation in attenuators 63 and 70 are set at the predetermined values under Mode 1.

When it is desirable, however, to receive the voice signal of opposite party under Mode 1, the circuit 60 may be constructed to operate in accordance with, for example, the modes of Tables 2 or 4, which are shown in FIGS. 3 and 6.

According to this embodiment, voice switching of a loud-speaking telephone system may be prevented from incorrect operation without impairing the natural quality of communication, because the voice signal picked-up by the comparator circuit is passed through the attenuator by changing the communicating condition after a lapse of time which is determined by the time constant of the second integrator which is independent of the level of said voice signal.

Thus, disadvantages such as blocking of communication and/or production of a howling phenomenon can hardly arise in the loud-speaking telephone system of the present invention.

In addition, it is apparent that the circuit according to the present invention can be applied to the other various kinds of well-known loud-speaking telephone systems. s Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A loud-speaking telephone system including:

detecting means for detecting, transmitting and receiving voice signals;

transmitting and receiving variable attenuators; and, circuit means for comparing signals detected by said detecting means to generate control signals for said variable attenuators, said circuit means comprising first and second input terminals connected to said detecting means, first and second output terminals connected to said attenuators, a first transistor circuit connected to said first input terminals and to said first output terminals, a second transistor connected to said second input terminals and said second output terminals, first means for turning said second transistor off when said first transistor is conductive, and second means for turning said first transistor off when said second transistor is conductive, whereby the respective amounts of attenuation of said attenuators are controlled in accordance with said control signals.

2. A loud-speaking telephone system as in claim 1, further comprising:

a voltage supply and a source of reference potential adapted to be coupled to said circuit means.

3. A loud-speaking telephone system as in claim 2, wherein said circuit means further comprises:

first and second series connected resistors connected between said first input terminal and the base of said first transistor, a third resistor connected between said voltage supply and the collector of said first transistor, and a fourth resistor connected between the collector of said first transistor and said reference potential, said collector of said first transistor being connected to said first output terminal, the emitter electrode of said first transistor being connected to said reference potential.

4. A loud-speaking telephone system as in claim 3, wherein said circuit means further comprises:

fifth and sixth series connected resistors connected between said second input terminal and the base of said second transistor, a seventh resistor connected between said voltage supply and the collector of said second transistor and an eighth resistor connected between the collector of said second transistor and said reference potential, said collector electrode of said second transistor being connected to said second input terminal, the emitter of said second transistor being connected to said reference potential;

a first diode connected to a junction between said first and second resistors and the collector of said second transistor; and a second diode connected to the junction between said fifth and sixth resistors and the collector electrode of said first transistor.

5. A loud-speaking telephone system as in claim 3, wherein said circuit means further comprises:

fifth and sixth series connected resistors connected between said second input terminal and the base of said second transistor, the collector of said second transistor being connected to said output terminal and a junction between said first and second resistors, the emitter of said second transistor being connected to said reference potential; and a diode connected between a junction between said fifth and sixth resistors and the collector of said first transistor.

6. A loud-speaking telephone system as in claim 2, wherein said circuit means comprises;

first and second series connected resistors connected between said first input terminal and the base of said first transistor, a junction between said first and second resistors being connected to said second input terminal, a third resistor connected between said voltage supply and the collector of said first transistor, and a fourth resistor connected between the collector of said first transistor and said reference potential, said collector electrode of said first transistor being connected to said first output terminal, the emitter of said transistor being connected to said reference potential;

fifth and sixth series connected resistors connected between said second input terminal and the base of said second transistor, and a seventh resistor connected between said voltage supply and the collector of said second transistor, the emitter of said second transistor being connected to said reference potential;

a first diode connected between a junction between said resistors and the collector of said second transistor; and a second diode connected to the junction between said fifth and sixth resistors and the collector of said first transistor.

7. A loud-speaking telephone system as in claim 3, wherein said circuit means further comprises:

fifth and sixth series connected resistors connected between said second input terminal and the base of said second transistor, and a seventh resistor connected between said voltage supply and the collector of said second transistor, the emitter of said second transistor being connected to said reference potential;

a first diode connected between a junction between said first and second resistors and the collector of said second transistor; and a second diode connected to the junction between said fifth and sixth resistors and the collector of said first transistor.

8. A loud-speaking telephone system as in claim 2, wherein said circuit means comprises:

first and second series connected resistors connected between said first input terminal and the base of said first transistor, the collector of said first transistor being connected to said first output terminal, the emitter of said first transistor being connected to said reference potential; and, third and fourth series connected resistors connected between said second input terminal and the base of said second transistor, the collector of said second transistor being connected to said second input terminal and the junction between said first and second resistors, the emitter of said second transistor being connected to said reference potential, the junction between said third and fourth resistors being connected to the collector of said first transistor.

9. A loud-speaking telephone system as in claim 2, wherein said circuit means comprises:

first and second series connected resistors connected between said first input terminal and the base of said first transistor, and a third resistor connected between said voltage supply and the collector of said first transistor;

a second voltage supply, fourth and fifth series resistors connected between said second input terminals and the base of said second transistor, and a sixth resistor connected between said second voltage supply and the collector of said second transistor, the emitter of said second transistor being connected to the collector electrode of said first transistor, a first diode connected to a junction between said first and second resistors and said second output terminals;

a second diode connected between said first output terminal and the collector of said first transistor, a third diode connected to the junction between said fourth and fifth resistors and said first output terminal; and a fourth diode connected between said second output terminal and the collector of said second transistor.

10. A loud-speaking telephone system as in claim 2, wherein said circuit means comprises:

first and second series connected resistors connected between said first input terminal and the base of said first transistor, and a third resistor connected between said voltage supply and the collector of said first transistor, said collector of said first transistor being connected to said first output terminal, the emitter of said first transistor being connected to said reference potential;

a second voltage supply;

fourth and fifth series connected resistors connected between said second input terminal and the base of said second transistor, and a sixth resistor connected between said second voltage supply and the collector of said second transistor, the emitter of said second transistor being connected to said reference potential;

a first diode connected to a junction between said first and second resistors and the collector of said second transistor; and a second diode connected to a junction between said fourth and fifth resistors and the collector of said first transistor.

* * * * *